Patented Jan. 25, 1938

2,106,240

UNITED STATES PATENT OFFICE 2,106,240

PROCESS FOR BREAKING PETROLEUM EMULSIONS

Melvin De Groote, St. Louis, and Bernhard Keiser, Webster Groves, Mo., assignors to The Tret-O-Lite Company, Webster Groves, Mo., a corporation of Missouri No Drawing. Application April 2, 1937, Serial No. 134,680

15 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive, and efficient process for separating emulsions of the kind referred to into their component parts of oil and water or brine.

Briefly described, our process consists in subjecting a petroleum emulsion to the action of a demulsifying agent comprising a carboxylic amide or an esterified carboxylic amide body of the kind hereinafter described; said amide or esterified amide body being characterized by the presence of a polybasic acid residue attached to the non-acyl part of the compound; that is, attached to a radical or residue in an aminohydrogen position. The most desirable procedure is to obtain a suitable amide having an alcoholic hydroxyl attached to a residue which replaces an aminohydrogen atom, and to react such amide with a polybasic carboxy acid or its anhydride, such as phthalic acid or anhydride. Materials of the kind contemplated for use as demulsifying agents in the present process may be obtained in various manners as hereinafter described.

It is well known, of course, that amides may be obtained by reaction between long chain carboxy acids and monoalkylolamines, such as monoethanolamine, monopropanolamine, monobutanolamine, etc. The manufacture of such chemical compounds, particularly where derived from higher fatty acids, is described in British Patent No. 450,672, dated July 17, 1936, to Orelup. Another procedure which has been employed for the same purpose is to react the monoalkylolamine with the acyl chloride derived from a suitable carboxy acid. Still another method employs the use of an alkylene oxide such as ethylene oxide, propylene oxide, butylene oxide, and the like, in connection with an amide. Reference is made to U. S. Patent No. 2,002,613, dated May 28, 1935, to Orthner and Keppler. This latter method for producing oxy-amides is not limited to the use of alkylolamines, such as monoalkylolamines, dialkylolamines, or the like, as the raw material, but may employ alkylamines, arylamines, aralkylamines, alicyclic amines, etc. so as to obtain hydroxylated derivatives. Naturally the methods employing monoalkylolamines, and particularly the process in which acyl chlorides are employed, may also use such materials as diethanolamine, dipropanolamine, dibutanolamine, and the like. Amides so obtained may have as many as six hydroxyl radicals in the aminohydrogen position.

It is known, of course, that when primary and secondary amines are reacted with various alkylene oxides, one may obtain hydroxy ethyl alkylamines, hydroxy propyl alkylamines, etc. The reaction, for example, between a primary amine and ethylene oxide, yields a material of the formula type $HO.CH_2.CH_2.NHR$. Such amines may be reacted with detergent-forming carboxy acids to give suitable amides, which in turn may be reacted with suitable polybasic carboxy acids.

The various amides or esterified amide bodies of the kind employed as demulsifying agents in the present process are derived most readily from detergent-forming carboxylic acids. Detergent-forming carboxylic acids are of the type of acids which combine with alkalies, such as caustic soda or caustic potash, to produce soap or soap-like bodies. Well known examples of such detergent-forming acids are fatty acids, such as oleic acid, stearic acid, etc., as well as abietic acid, and various naphthenic acids. Petroleum carboxy acids are also derived by the oxidation of paraffin or petroleum wax and may be used to produce the treating agent contemplated by our process, provided that they are characterized by the fact that they combine with alkalies to form soap or soap-like materials.

Obviously, the detergent acid of the type RCOOH, which supplies the acyl radical R—CO, may be subjected to any suitable modification which does not destroy its ability to form a soap or soap-like body. For instance, oleic acid may be chlorinated, and one might employ such chlorinated oleic acid instead of oleic acid, in producing the treating agent used in our process. Ricinoleic acid may be sulfated to produce sulforicinoleic acid, and this particular material may be employed. Rosin might be hydrogenated and such hydrogenated abietic acid might be employed. Naphthenic acids may be brominated, and such brominated naphthenic acids may be employed. In all cases, the modified form must still possess the detergent-forming characteristic of the unaltered parent acid. The words "detergent-forming acid" will hereafter be used in the sense to include not only such materials as naphthenic acids, fatty acids, abietic acids, etc., but also their modifications of the kind indicated as being equally suitable.

Typical of some of the amides which may be subjected to further reaction with polybasic carboxy acids, so as to produce the demulsifying agent employed in the present process, are the following:

R—CO—NR'CH₂CH₂OH or

R—CO—NH—C₂H₄—OH or

R—CO—NH—CHOH—CH₂OH or

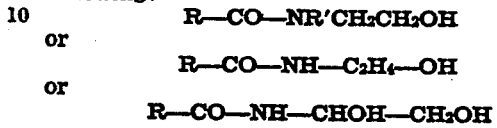

or

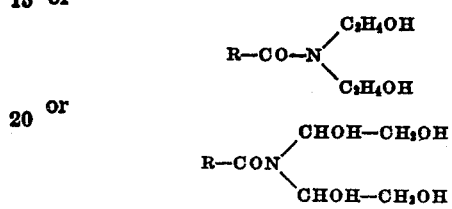

In the above formulas, R denotes a hydrocarbon or oxy-hydrocarbon radical derived from a detergent-forming carboxy acid, and R' denotes an alkyl radical.

It has been pointed out that suitable amides which may be considered as an intermediate material in the manufacture of the demulsifying agent employed in the present process, are obtainable from hydroxyalkyl-alkylamines, which in turn may be considered as derivatives of alkylene oxides or chlorhydrins, as illustrated by the following reactions:

$$CH_2Cl$$
$$|\phantom{CH}\phantom{2}Cl$$
$$CH_2OH\ +\ HHN(C_5H_{11})\ \rightarrow\ \begin{array}{l}CH_2HN(C_5H_{11})\\|\\CH_2OH\end{array}$$

$$\begin{array}{l}CH_2\\ \phantom{CH_2}\!\!\searrow\!\! O\end{array}\ +\ HHN(C_5H_{11})\ \rightarrow\ \begin{array}{l}CH_2HN(C_5H_{11})\\|\\CH_2OH\end{array}$$

Reference is made to U. S. Letters Patent No. 2,042,621, dated June 2, 1936, to Olin. This particular patent discloses the manufacture of amines comparable to those described immediately above, but derived from a trihydric alcohol as the ultimate parent material, instead of being derived from a dihydric alcohol as the parent material. Ethylene oxide and ethylene chlorhydrin, for example, may be classified as derivatives of glycol. One of the materials there described, for example, is 1-mono-amyl amino propane-2,3-diol (1-mono-amyl amino-2-hydroxy-3-propanol), which is of the following formula:

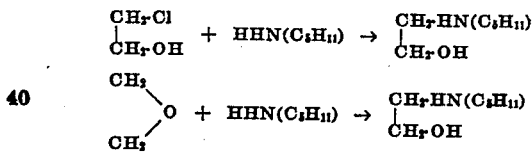

Similar materials are obtainable from glycidol and also are obtainable from alcohol ethers, such as diglycerol, diethylene glycol and the like, instead of from the glycols, glycerol, and the like. Other comparable materials include 1-monobenzyl amino propane-2,3-diol, which is of the following formula:

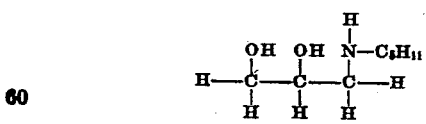

Similar derivatives are obtainable from an alicyclic amine, such as cyclohexylamine, methyl-cyclohexylamine, and the like, by reacting such amines with glycerol monochlorhydrin and the like.

It is to be noted that one might employ a diamide. If two moles of a detergent-forming carboxy acid body, for instance, a fatty acid chloride, are united with one mole of an alkylolamine, for example, one may obtain a compound indicated by the following type formula:

(R—CO)₂NC₂H₄OH

The intermediate product which may be esterified to produce the demulsifying agent of the present process may be characterized in its broadest aspect by the following formula:

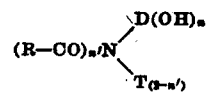

in which $n$ and $n'$ represent the numerals one or two; D is a divalent or trivalent hydrocarbon radical; and T represents a hydrogen atom or a monovalent hydrocarbon radical, particularly an alkyl radical, or it may represent the same radical as D(OH)$_n$, and R—CO represents the acyl radical of a detergent-forming carboxy acid.

Such intermediate products, that is, amides of the kind described, are treated with a polybasic carboxy acid such as phthalic acid. Obviously, instead of the acid itself, one may employ the anhydride or the acyl chloride, or any other functional equivalent. The reaction between such polybasic carboxy acid compound and the hydroxyl-containing residue in an amino hydrogen position results in an esterification reaction and usually with the elimination of water, except in such instances where the polybasic carboxy acid anhydride or other similar compound is used.

In the manufacture of the reagents above described, the polybasic carboxy acids employed include the following: those of the aromatic type, alkyl type, aralkyl type, alicyclic type, heterocyclic type, etc. Suitable examples, including those previously pointed out, are succinic, maleic, malic, aconitic, tartaric, citric, fumaric, oxalic, tricarballylic, trihydroxy - glutaric, mesoxalic, phthalic, diphenic, naphthalic, benzoyl-benzoic, trimesic, mellitic, cinchomaronic, quinolinic, camphoric, aspartic, norpinic, glutamic, etc. In addition, the polyhydroxy phenols, which are amphoteric in nature, such as catechol, resorcinol, quinol, pyrogallol, hexahydrophenol, etc., may be employed as and are equivalent to polybasic carboxy acids when caused to react with more basic substances or are equivalent to polyhydric alcohols when caused to react with more acidic substances than themselves.

In many instances, it happens that the ester so formed contains a free carboxylic hydrogen, and it is evident that such carboxylic hydrogen atom may be replaced by any suitable organic radical or by a metallic atom or by an ammonium radical, or by a substituted ammonium radical (amine radical). For instance, such ionizable hydrogen atom may be replaced by an alkyl radical derived from a monohydric alcohol, such as methyl alcohol, ethyl alcohol, propyl alcohol, butyl alcohol, amyl alcohol, hexyl alcohol, etc. The material may be neutralized with any suitable base, such as caustic soda, caustic potash, ammonia, propanolamine, dipropanolamine, tripropanolamine, triethanolamine, diethanolamine, benzylamine, amylamine, diamylamine, triamylamine, or the like. One may likewise prepare polyvalent metallic salts, such as iron salts, copper salts, lead salts, calcium salts, magnesium salts, etc.

Furthermore, such carboxylic hydrogen may be neutralized by reaction with various polyhydric alcohols. Such polyhydric alcohols may be aliphatic, aromatic, cyclic, aralkyl, heterocyclic, etc. Suitable polyhydric alcohols include ethylene glycol, glycerol, erythritol, adonitol, mannitol, dihydroxyl-naphthalene, alizarin, purpurin, terpin, dihydroxy-thiophene, ethyl trihydroxy-palmitate, ethyl trihydroxy-chlorpalmitate, etc.

In view of what has been said previously, it is obvious that compounds may be obtained in which there is no residual hydroxyl or no residual carboxyl. Such compounds may be considered of the neutral type. The compounds in which there is a residual alcoholic hydroxyl may be considered as being of the basic type, whereas those in which there is a residual carboxyl may be considered as being of the acid type.

It is to be noted that other forms of the reagent may be made in various ways. For instance, if the polybasic carboxy acid happens to be tribasic, it is obvious that one might neutralize one residual hydrogen atom with a metal and perhaps leave another carboxylic hydrogen unneutralized. In event that the detergent-forming carboxy acid amide is derived from a hydroxylated material, such as ricinoleic acid, hydroxystearic acid, etc., then such hydroxyl which happens to be present in the acyl radical may be subjected to various reactions of the kind which are well-known, such as sulfonation, reaction with phthalic acid and the like. Similarly, if the detergent-forming carboxy acid is derived from an unsaturated acid such as oleic acid, or the like, it may be subjected to the usual reactions involving the ethylene linkage, such as halogenation, sulfation, etc.

Insofar that the amides above described are suitable intermediate materials in the manufacture of the demulsifying agent employed in the present process and may contain at least as many as four alcoholic hydroxyls, and insofar that the polybasic carboxy acids employed to react therewith may contain two or three carboxylic radicals, it is obvious that the reaction between the two classes of materials may take place in various molecular ratios, such as 1–1, 1–2, 1–3, or 4–1, 3–1, or 2–1. It is further emphasized that the process is concerned with reagents of the kind fully described and is not dependent on any particular way in which the reagents are obtained, except when specifically so stated. They may be produced in any suitable manner. Any isomeric form may be employed; as far as we are aware, one isomeric form is as suitable as another. It is also obvious that any functional equivalent of any compound which obviously acts in the same way as the compound itself, is just as suitable as the unaltered material. For instance, the chlorinated amide derived from oleic acid dichloride is just as suitable as the amide derived from oleic acid. Chlorphthalic acid is just as suitable as phthalic acid. An amine in which a chloralkyl radical replaces an alkyl radical is just as satisfactory as if the unaltered alkyl radical were present in the amine.

Our preferred reagent is obtained by reacting approximately 300 pounds of ricinoleic acid with approximately 105 pounds of diethanolamine to produce a compound of the following formula:

Such material is then reacted with approximately 445 pounds of phthalic anhydride to give a compound of the following composition:

$C_{17}H_{32}COOC_6H_4COOH.CON$

This material is then further reacted with approximately 92 pounds of glycerol to give an esterified material whose composition cannot be indicated exactly because reactions take place between various hydroxyls of the glycerol and various carboxyls, and in all likelihood such product may be a mixture of the various esters, acid esters, and basic esters. An equally satisfactory material is obtained by replacing the diethanolamine with an equivalent weight of 1-mono-amyl amino-2,3-diol.

In order to avoid complexity of subject matter, the following facts may be emphasized: If a polybasic carboxy acid is denoted by $B(COOH)_{n''}$ where $n''$ denotes the numerals 2 or 3 and B denotes the polybasic carboxy acid residue, then bearing in mind that the carboxylic hydrogen may be replaced by a metal such as sodium, potassium, and the like, or by the ammonium radical, or by a substituted ammonium radical, or by a monovalent organic radical such as an alkyl radical, aryl radical, aralkyl radical, alicyclic radical, or by a residue derived from a polyhydric alcohol such as glycerol, glycol, or the like, it becomes apparent that the expression $B(COOH)_{n''}$ may be suitably rewritten $$B(OOZ)_{n''},$$

in which the characters have their previous significance, and Z represents an ionizable hydrogen atom equivalent.

For convenience, then, at least the majority of chemical compounds employed as demulsifying agents in the present process may be characterized as being of the composition: Y.X in which Y denotes a residue derived from an amide of the formula:

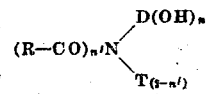

in which $n$ and $n'$ represent the numerals one or two; D is a divalent or trivalent hydrocarbon radical; and T represents a hydrogen atom or a monovalent hydrocarbon radical, particularly an alkyl radical, or it represents the same as $(D(OH)_n)$ and R—CO represents the acyl radical of a detergent-forming carboxy acid; and X is a residue derived from a polybasic carboxy acid of the type:

$$B(COO.Z)_{n''}$$

in which $n''$ denotes the numerals two or three B denotes the polybasic carboxy acid residue, and Z represents an ionizable hydrogen atom equivalent.

When $B(COO.Z)_{n''}$ reacts with the radical $$[D(OH)_n]$$

there is obtained a residue which may be considered as derived from a hydrocarbon in which at least one or more hydrogen atoms of the hypothetical saturated parent hydrocarbon have been replaced by one or more polybasic carboxy acid residues. For sake of convenience, such a radical will be referred to as a polybasic carboxy hydrocarbon residue, without differentiation as to whether or not there may also be present a residual hydroxyl radical, replacing additional hydrogen atom of the hypothetical parent hydrocarbon (polybasic oxy-carboxy hydrocarbon residue).

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, or the like.

It is well known that conventional demulsifying agents may be used in a water-soluble form, or in an oil soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated in any of the various ways or by any of the various apparatus now generally employed to resolve or break petroleum emulsions with a chemical reagent, or may be employed co-jointly in combination with other non-chemical processes intended to effect demulsification.

Having thus described our invention, what we claim as new and desire to secure by Letters Patent is:

1. A process for breaking a petroleum emulsion of the water-in-oil type, which consists in subjecting the emulsion to the action of a demulsifying agent comprising a chemical compound of the formula type Y.X, in which Y denotes a residue derived from an amide of the formula:

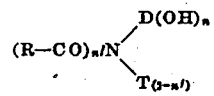

in which $n$ and $n'$ represent the numerals one or two, D is a hydrocarbon radical; and T represents a non-ionizable hydrogen atom equivalent, selected from the class consisting of a hydrogen atom, a monovalent hydrocarbon radical, and a hydroxylated hydrocarbon radical having not more than two hydroxyl radicals as a part thereof; and R—CO represents the acyl radical of a detergent-forming carboxy acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

2. A process for breaking a petroleum emulsion of the water-in-oil type, which consists in subjecting the emulsion to the action of a demulsifying agent comprising a chemical compound of the formula type Y.X, in which Y denotes a residue derived from an amide of the formula:

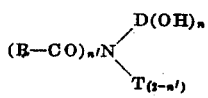

in which $n$ and $n'$ represent the numerals one or two; D is a hydrocarbon radical; and T represents a non-ionizable hydrogen atom equivalent, selected from the class consisting of a hydrogen atom, a monovalent hydrocarbon radical, and a hydroxylated hydrocarbon radical having not more than two hydroxyl radicals as a part thereof; and R—CO represents the acyl radical of a rosin acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

3. A process for breaking a petroleum emulsion of the water-in-oil type, which consists in subjecting the emulsion to the action of a demulsifying agent comprising a chemical compound of the formula type Y.X, in which Y denotes a residue derived from an amide of the formula:

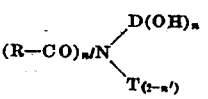

in which $n$ and $n'$ represent the numerals one or two; D is a hydrocarbon radical; and T represents a non-ionizable hydrogen atom equivalent, selected from the class consisting of a hydrogen atom, a monovalent hydrocarbon radical, and a hydroxylated hydrocarbon radical having not more than two hydroxyl radicals as a part thereof; and R—CO represents the acyl radical of a petroleum acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

4. A process for breaking a petroleum emulsion of the water-in-oil type, which consists in subjecting the emulsion to the action of a demulsifying agent comprising a chemical compound of the formula type Y.X, in which Y denotes a residue derived from an amide of the formula:

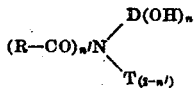

in which $n$ and $n'$ represent the numerals one or two; D is a hydrocarbon radical; and T represents a non-ionizable hydrogen atom equivalent, selected from the class consisting of a hydrogen atom, a monovalent hydrocarbon radical, and a hydroxylated hydrocarbon radical having not more than two hydroxyl radicals as a part thereof; and R—CO represents the acyl radical of a fatty acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

5. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

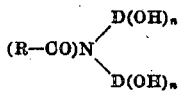

in which $n$ represents the numerals one or two; D is a hydrocarbon radical; R—CO represents the acyl radical of a fatty acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

6. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

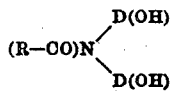

in which D is a divalent hydrocarbon radical; R—CO represents the acyl radical of a fatty acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

7. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

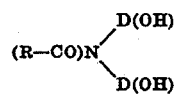

in which D is a $C_2H_4$ radical; R—CO represents the acyl radical of a fatty acid; and X is a residue derived from a polybasic carboxy acid of the type:

in which $n''$ denotes a numeral at least as great as 2 and no greater than 3, B denotes the polybasic carboxy acid residue, and Z represents an ionizable hydrogen atom equivalent.

8. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

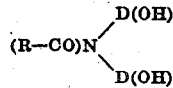

in which D is a $C_2H_4$ radical; R—CO represents the acyl radical of a fatty acid; and X is a residue derived from a dibasic carboxy acid of the type:

in which $n''$ denotes the numeral two, B denotes the dibasic carboxy acid residue, and Z represents an ionizable hydrogen atom equivalent.

9. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

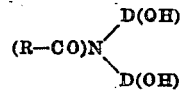

in which D is a $C_2H_4$ radical; R—CO represents the acyl radical of a fatty acid; and X is a residue derived from a dibasic carboxy acid of the type:

in which $n''$ denotes the numeral two, B denotes the dibasic aromatic carboxy acid residue, and Z represents an ionizable hydrogen atom equivalent.

10. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

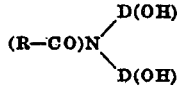

in which D is a $C_2H_4$ radical; R—CO represents the acyl radical of a fatty acid; and X is a residue derived from a dibasic carboxy acid of the type:

in which $n''$ denotes the numeral two, B denotes a phthalic acid residue, and Z represents an ionizable hydrogen atom equivalent.

11. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

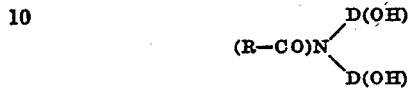

in which D is a $C_2H_4$ radical; R—CO represents the acyl radical of a fatty acid; and X is a residue derived from a dibasic carboxy acid of the type:

in which $n''$ denotes the numeral two, B denotes a phthalic acid residue, and Z represents an ionizable hydrogen atom equivalent derived from glycerol.

12. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

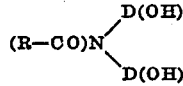

in which D is a $C_2H_4$ radical; R—CO represents the acyl radical of a fatty acid; and X is a residue derived from a dibasic carboxy acid of the type:

in which $n''$ denotes the numeral two, B denotes a phthalic acid residue, and Z represents an ionizable hydrogen atom equivalent derived from glycerol; said compound Y.Z being additionally characterized by being neutral in character.

13. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

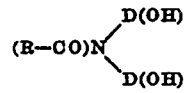

in which D is a $C_2H_4$ radical; R—CO represents the acyl radical of a fatty acid; and X is a residue derived from a dibasic carboxy acid of the type:

in which $n''$ denotes the numeral two, B denotes a phthalic acid residue, and Z represents an ionizable hydrogen atom equivalent derived from glycerol; said compound Y.Z being additionally characterized by being acid in character.

14. A process for breaking a petroleum emulsion of the water-in-oil type, which consists in subjecting the emulsion to the action of a demulsifying agent comprising a chemical compound of the formula type Y.Z, in which Y denotes a residue derived from an amide of the formula:

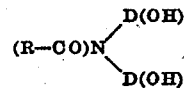

in which D is a $C_2H_4$ radical; R—CO represents the acyl radical of a fatty acid; and X is a residue derived from a dibasic carboxy acid of the type:

in which $n''$ denotes the numeral two, B denotes a phthalic acid residue, and Z represents an ionizable hydrogen atom equivalent derived from glycerol; said compound Y.Z being additionally characterized by being basic in character.

15. A process for breaking a petroleum emulsion of the water-in-oil type, which consists in subjecting the emulsion to the action of a demulsifying agent comprising a chemical compound obtained by an esterification reaction between a polybasic carboxy acid body and an amide derived from a detergent-forming carboxy acid; said amide being characterized by the presence of a hydrocarbon oxy residue in an amino hydrogen position.

MELVIN DE GROOTE.
BERNHARD KEISER.